UNITED STATES PATENT OFFICE.

OTTO CLAUDE IMMISCH, OF FINCHLEY, ENGLAND.

METHOD OF MANUFACTURING GOODS OF RUBBER, EBONITE, OR VULCANITE.

No. 931,310.

Specification of Letters Patent.

Patented Aug. 17, 1909.

Application filed February 19, 1909. Serial No. 473,964.

*To all whom it may concern:*

Be it known that I, OTTO CLAUDE IMMISCH, a subject of the King of Great Britain, residing at 4 Woodside Park road, Finchley, Middlesex, England, have invented a new and useful Method of Manufacturing Goods of Rubber, Ebonite, or Vulcanite; and I do hereby declare that the following is a full, clear, and exact description of the invention, which will enable others skilled in the art to which it appertains to make and use the same.

My invention relates to the manufacture of goods or articles of various kinds and shapes from old or waste rubber, vulcanite and the like.

The method hitherto generally adopted for reforming articles from waste rubber, vulcanite and the like, consists in subjecting the waste material, ground to a fine condition, to pressure in a mold at a temperature considerably above the ordinary vulcanizing temperature. With this method of manufacture, however, the material appears to consist of an aggregation of the granulated of pulverized particles rather than to possess the structure of a homogeneous mass. In order to improve the quality of the material by increasing the homogeneity it has been proposed to increase the temperature to which the material is raised, and also to expel the air from the mass, by increasing the pressure but these proceedings have not had the result of producing reformed rubber of a quality equal to that of the original rubber.

According to my invention I add to the waste rubber, preferably broken up into small particles known in the rubber trade as "crumb" (instead of being reduced to a granulated or pulverized condition) a small quantity of a volatile liquid such as cajeput oil or a solution of a volatile oil, having no deleterious effect upon the rubber and having a boiling point slightly below the temperature employed in the subsequent treatment of the material.

The oil or other volatile liquid having been mixed with the mass the latter is then placed in a hot mold having a larger capacity than the volume of the article required, say in the direction of the longest dimension. The mold is then closed under pressure preferably less than will be ultimately used and raised to a vulcanizing temperature of say from 220 to 280° Fah., with the result that the oil mingled with the mass becomes vaporized, the vapor displacing the air contained in the interstices of the mass.

In practice I have found that a quantity of oil equal to a 10th of 1 per cent. of the mass gives a good result but it is understood that the quantity of oil used must in all cases be enough to produce sufficient oil vapor to drive out any air contained between the particles as hereinbefore mentioned. While still hot the mold is now placed in a suitable press and subjected to such pressure that the volume of its contents shall be approximately that of the required article the pressure being preferably maintained while the mold is cooling. When cool a clamp is attached to the mold to retain the pressure in the mold and its contents are then slowly reheated in the temperature before mentioned.

If desired, the mold may be again subjected to pressure and reheated this compressing and reheating being repeated as often as desired as thereby greater density can be imparted to the reformed articles than that possessed by the original rubber.

In order to avoid injury to the mold through any exceptional pressure arising through the expansion of the material during the heating operation I find that in the manufacture of articles of large dimensions it is desirable to provide means, such as a spring, which will yield slightly under any excess of pressure above that which the clamp is intended to retain.

Having now particularly described and ascertained the nature of my said invention and in what manner the same is to be performed, I declare that what I claim is:—

1. In the manufacture of articles from waste rubber, vulcanite or the like, the addition to the mass of just about enough of an oil, volatile at a temperature slightly below that used in the subsequent treatment, said oil being of such a nature that when the mass is heated to the required temperature the restoration of plasticity will be accompanied by the expulsion from the mass of the entrapped air by the vapors of said volatile oil.

2. The process of manufacturing articles from waste rubber, vulcanite or the like, consisting in reducing the material to be treated to a suitable state of disintegration adding thereto a quantity of cajeput oil, then subjecting the mass under slight pressure in a mold to a temperature from 220° to 280° Fah., in order to volatilize the oil and then compressing and cooling the mass.

3. The process of manufacturing articles from waste rubber, vulcanite or the like, consisting in reducing the material to be treated, to a suitable state of disintegration, adding thereto just about enough of an oil volatile at a temperature slightly below that used in the subsequent treatment, said oil being of such a nature that when the mass is heated to the required temperature, the restoration of plasticity will be accompanied by the expulsion of the entrapped air by the vapors of said volatile oil, subjecting the mass under slight pressure in the mold to a temperature from 220° to 280° Fah., compressing the same so that it shall assume approximately the shape of the finished article, allowing it to cool while maintaining the pressure and then reheating it and again allowing it to cool.

4. The process of manufacturing articles from waste rubber, vulcanite or the like, consisting in reducing the material to be treated to a suitable state of disintegration, adding thereto about one-tenth of one per cent. of a volatile oil of such a nature that when the mass is heated to the required temperature, the restoration of plasticity will be accompanied by the expulsion of the entrapped air, by the vapors of said volatile oil, subjecting the mass under slight pressure in the mold to a temperature from 220° to 280° Fah., compressing the same so that it shall assume approximately the shape of the finished article, allowing it to cool while maintaining the pressure and then reheating it and again allowing it to cool

OTTO CLAUDE IMMISCH.

Witnesses:
JOHN E. BOUSFIELD,
C. G. REDFERN.